US010553070B2

(12) United States Patent
Ratier et al.

(10) Patent No.: US 10,553,070 B2
(45) Date of Patent: Feb. 4, 2020

(54) METHOD FOR PARTICIPATING IN A LOTTERY IMPLEMENTED BY A MOBILE TERMINAL

(71) Applicant: MORPHO, Issy-les-Moulineaux (FR)

(72) Inventors: Jean-Baptiste Ratier, Issy-les-Moulineaux (FR); Vincent Herbaut, Issy-les-Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 333 days.

(21) Appl. No.: 15/144,619

(22) Filed: May 2, 2016

(65) Prior Publication Data

US 2016/0328911 A1 Nov. 10, 2016

(30) Foreign Application Priority Data

May 4, 2015 (FR) ..................................... 15 53981

(51) Int. Cl.
*G07F 17/32* (2006.01)

(52) U.S. Cl.
CPC ........ *G07F 17/3227* (2013.01); *G07F 17/329* (2013.01)

(58) Field of Classification Search
CPC ..... G07F 17/32; G07F 17/3227; G07F 17/329
USPC .......................................................... 463/17
See application file for complete search history.

(56) References Cited

U.S. PATENT DOCUMENTS

| 5,276,312 A * | 1/1994 | McCarthy | ............... A63F 3/081 235/380 |
| 2003/0176162 A1 | 9/2003 | Planki et al. | |
| 2004/0032083 A1 * | 2/2004 | Walker | ................. G06Q 10/087 273/269 |
| 2005/0181875 A1 * | 8/2005 | Hoehne | ................... G07F 17/32 463/41 |
| 2009/0222655 A1 * | 9/2009 | Martinent | ........... H04L 63/0853 713/150 |

(Continued)

FOREIGN PATENT DOCUMENTS

| WO | WO-9838820 | 9/1998 |
| WO | WO-2007088203 | 8/2007 |

OTHER PUBLICATIONS

French Search Report and Written Opinion, dated Feb. 16, 2016, French Application No. 1553981.

*Primary Examiner* — Omkar A Deodhar
*Assistant Examiner* — Shauna-Kay Hall
(74) *Attorney, Agent, or Firm* — Womble Bond Dickinson (US) LLP (57) ABSTRACT

A method for participating in a lottery is proposed. The following steps are applied by a mobile terminal having an input interface and a secured element. The steps include sending to a lottery server system a subscriber number specific to an identification card of a subscriber of the mobile terminal, receiving a command for configuring the secured element having as addressee the subscriber number, allocating, in the secured element, a memory space from the received configuration command, acquiring via the interface bet data, sending the acquired bet data to the lottery server system, receiving a virtual lottery ticket with a unique identifier generated by the lottery server system in response to the sending of the bet data, and storing the virtual lottery ticket in the secured element.

7 Claims, 5 Drawing Sheets

(56) References Cited

U.S. PATENT DOCUMENTS

| | | | |
|---|---|---|---|
| 2010/0069136 A1* | 3/2010 | Safaei | G07F 17/32 |
| | | | 463/17 |
| 2011/0032078 A1* | 2/2011 | Guziel | G07F 17/3209 |
| | | | 340/5.86 |
| 2012/0276976 A1* | 11/2012 | Yoo | G07F 17/329 |
| | | | 463/17 |
| 2012/0323708 A1* | 12/2012 | Marinakis | G06Q 30/06 |
| | | | 705/16 |
| 2013/0012286 A1* | 1/2013 | Schuff | G07F 17/32 |
| | | | 463/17 |
| 2013/0267297 A1* | 10/2013 | Aligizakis | G07F 17/3218 |
| | | | 463/17 |
| 2013/0310151 A1 | 11/2013 | Richards et al. | |
| 2013/0344932 A1* | 12/2013 | Adams | G07F 17/34 |
| | | | 463/17 |
| 2014/0051507 A1* | 2/2014 | Shapiro | G07F 17/3218 |
| | | | 463/29 |
| 2014/0080563 A1 | 3/2014 | Johnson | |
| 2014/0126764 A1* | 5/2014 | Wang | G06Q 30/06 |
| | | | 382/100 |
| 2015/0046285 A1* | 2/2015 | Baazov | G06Q 50/34 |
| | | | 705/26.25 |
| 2015/0050977 A1* | 2/2015 | Omar | G06Q 20/0457 |
| | | | 463/17 |

\* cited by examiner

METHOD FOR PARTICIPATING IN A LOTTERY IMPLEMENTED BY A MOBILE TERMINAL

GENERAL FIELD

The invention relates to a method for participating in a lottery, to a method for organizing a lottery, and to devices for applying such methods.

STATE OF THE ART

A lottery is defined as a game aiming at distributing gains to one or randomly selected winners by a drawing carried out from among players having an initial bet.

By the term of "bet" is meant the initial bet of one of the players. This initial bet may for example be an amount of money.

The gain may also be an amount of money.

Present lottery organizers print a physical ticket "to the bearer", i.e. a receipt acting as a proof for repayment of a gain. In the continuation of the present document, the term "lottery ticket" will refer to a proof for participating in a lottery.

The printing of tickets is generally applied by participation terminals, which are made available to the participants in sale locations. The verification of the tickets acting as proof is also applied by participation terminals.

Now, such printed lottery tickets have drawbacks.

Firstly, a ticket in paper form has risks of falsification.

Secondly, the printing of paper has a high cost for the lottery organization: a direct cost (paper consumed for each ticket) and an indirect cost (adaptation of the participation terminals for their edition and their readout).

Thirdly, a ticket "to the bearer" is by definition non-nominative, without any link with the participant having purchased it. Also, in the case of loss or theft of the ticket, the participant irremediably loses his/her gain.

Fourthly, the lottery organization cannot announce to the participant his/her gain in an anonymous way.

Fifthly, an organization organizing a lottery has no visibility on the playing habits of the players, since the tickets are anonymous.

PRESENTATION OF THE INVENTION

An object of the invention is to overcome at least one of the drawbacks mentioned above.

In order to attain this object, the invention proposes a method for participating in a lottery comprising the following steps applied by a mobile terminal comprising an input interface and a secured element:
  acquisition via the input interface of bet data,
  sending the acquired bet data to the lottery server system,
  receiving a virtual lottery ticket generated by the lottery server system in response to the sending of the bet data, the virtual lottery ticket comprising a unique identifier of the bet made,
  storing in memory the virtual lottery ticket in the allocated memory space.

The mobile terminal is a user personal terminal. The storage of the virtual lottery ticket in the memory of the terminal therefore generates a link between the ticket and the user.

Further, as this storage in memory is carried out in a secured element of the mobile terminal, the risks of falsification of the virtual ticket may be avoided.

The method may also be completed with the following steps, taken alone or in any of their technically possible combinations:
  sending to a lottery server system a subscriber number specific to a subscriber identification card, to a mobile network of the mobile terminal,
  receiving a command for configuring the secured element having as an addressee the subscriber number,
  allocating, in the secured element, a memory space from the received configuration command,
  establishing a near field communication channel with a relay terminal, the bet data being emitted into the channel established with view to their retransmission by the relay terminal to the lottery server system;
  comparison between a code inputted via the input interface and a reference code stored in memory by the secured element and specific to the user of the mobile terminal, the bet data being either emitted or not to the lottery server system depending on the result of the comparison;
  receiving a gain value emitted by the lottery server system and associated with the unique identifier;
  displaying the gain value received on a screen of the mobile terminal;
  sending to the lottery server system a gain request comprising the unique identifier stored in memory by the secured element, the reception of the gain value being a response to the sending of the gain request;
  deletion of the virtual lottery ticket stored in memory in the secured element in response to receiving a gain of zero value associated with the unique identifier, and/or receiving a message indicating that a payment of a gain value associated with the unique identifier has been carried out to the benefit of a beneficiary identified by the bet data.

The invention proposes according to a second aspect, a method for participating in a lottery characterized in that it comprises the following steps applied by a relay terminal:
  receiving bet data emitted by a mobile terminal,
  transmitting the received data to a lottery server system,
  receiving a virtual lottery ticket generated by the lottery server system in response to the transmission, the virtual lottery ticket comprising a unique identifier giving the possibility of identifying the bet made,
  printing from the bet data and/or from the virtual lottery ticket a small invoice identifying the bet made.

The method according to the second aspect of the invention may further comprise steps for:
  receiving the unique identifier emitted by the mobile terminal,
  emitting to the lottery server a gain request comprising the unique identifier,
  receiving a gain value associated with the unique identifier in response to the gain request,
  applying at least one of the following steps:
    displaying the gain value on a screen of the relay terminal,
    transmitting the gain value to the mobile terminal,
    distributing an amount of cash corresponding to the gain value stored in a dispenser of the relay terminal.

According to a third aspect of the invention, a method for organizing a virtual lottery is also proposed, comprising the following steps applied by a lottery server system:
  receiving bet data emitted by a mobile terminal comprising a secured element, generating a virtual lottery ticket in response to the reception of the lottery ticket comprising a unique identifier allowing identification of the bet made, sending the virtual lottery ticket generated at the mobile terminal with view to it being stored in memory by the secured element.

According to a fourth aspect of the invention, a mobile terminal is further proposed comprising:

an interface for inputting bet data, a communications interface for communicating with a lottery server system, a secured element comprising a memory, an identification card of a subscriber to a mobile network, the card being specifically associated with a subscriber number, at least one processing unit configured for controlling:
sending the inputted bet data to the lottery server system,
storing in the memory of the secured element a virtual lottery ticket generated by the server in response to the sending, received by the communications interface, the virtual lottery ticket comprising a unique identifier allowing identification of the bet made.

The secured element may comprise:

the identification card of a subscriber to a mobile network, or a trustworthy executing environment of the mobile terminal, or a removable memory card with respect to the mobile terminal.

According to a fifth aspect of the invention, a relay terminal is proposed comprising:

a communications interface adapted for:
receiving bet data emitted by a mobile terminal,
transmitting the bet data to a lottery server system,
receiving a virtual lottery ticket generated by the server in response to the transmission, the virtual lottery ticket comprising a unique identifier allowing identification of the bet made, a printer, and a processing unit configured for controlling the printing by the printer of a small invoice identifying the bet made, from the bet data and/or from the virtual lottery ticket.

According to a sixth aspect, a lottery server system is further proposed comprising:

a first communications interface for receiving bet data emitted by a mobile terminal comprising a secured element, at least one processing unit configured for generating a virtual lottery ticket in response to the reception of the bet data, the virtual lottery ticket comprising a unique identifier allowing identification of the bet made, a second communications interface for sending the generated virtual lottery ticket to the mobile terminal with view to it being stored in memory by the secured element.

This server system may further comprise the customer relationship management server.

DESCRIPTION OF THE FIGURES

Other features, objects and advantages of the invention will become apparent from the description which follows, which is purely illustrative and non-limiting, and which should be read with reference to the appended drawings wherein.

On the whole of the figures, similar elements bear identical references.

DETAILED DESCRIPTION OF THE INVENTION

Figure 1:
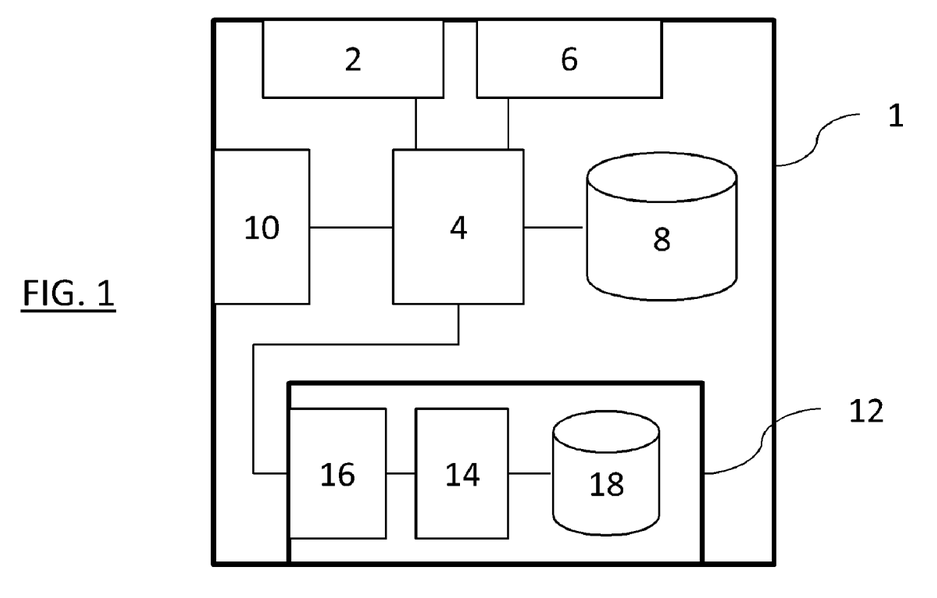
FIG. 1 schematically illustrates a mobile terminal according to an embodiment of the invention.

With reference to FIG. 1, a mobile terminal 1 comprises an input interface 2, a data processing unit 4, a display screen 6, a memory 8, a network communications interface 10, and a secured element 12.

The input interface 2 for example comprises a keyboard and/or a touch screen and/or a mouse. This input interface may also comprise a biometric sensor, for example adapted for recognizing a fingerprint.

The data processing unit 4 is able to receive data inputted through the input interface 2. The data processing unit 4 for example comprises one or several processors.

The data processing unit 4 is connected to the display screen 6 so as to display the graphic data on this screen 6. The data processing unit 4 is also connected to the memory 8, and able to write data into said memory 8 or read data written beforehand into the memory 8.

The memory 8 for example comprises one or several hard discs, and/or one or several discs of the SSD type and/or one or several memories of the EEPROM type and/or one or several memories of the flash type. This memory 8 may comprise at least one disc permanently housed in the mobile terminal 1 and/or comprise at least one removable key for example provided with a USB connector.

The mobile terminal 1 further comprises an operating system stored in memory by the memory 8 and able to be executed by the processing unit 4. This operating system may cooperate with application programs, generally called "applications", which may be installed in the mobile terminal independently of the operating system.

The network communications interface 10 is adapted for communicating with another device in proximity through a channel with or without any wire. The network communications interface 10 for example comprises an NFC (Near Field Communication) chip for establishing a near field communications channel with another device. In the following, this communication method will be taken as a by no means limiting example for applying the invention. The communications interface 10 may alternatively be adapted for applying other wireless communications protocols (Wi-Fi, Bluetooth).

In a way known per se, the secure element 12 ("Secure Element", abbreviated as SE) is an intangible hardware platform, capable of receiving quite safely applications and storing confidential and cryptographic data.

The secured element 12 typically appears as a removable electronic card, which is inserted into a housing of the mobile terminal 1. The secured element 12 is for example an electronic card with the UICC or SIM format. The secured element is alternatively a removable memory card, for example with the MicroSD format.

The secured element may alternatively appear as a component of the mobile terminal, conventionally called "Embedded Secure Element", or else a logic element of the terminal adapted for securing the execution and the storage of applications and of data of the terminal, conventionally called "Trusted Execution Environment".

Regardless of its form, the secured element 12 may be protected by an encryption key specifically assigned to an owner of the secured element. Thus, when the secured element is an identification card of a subscriber to a mobile network, this encryption key may be a PIN code.

The secured element 12 comprises a communications interface 16 adapted for communicating with the data processing unit 4 of the mobile terminal 1, an internal processing unit 14 and an internal memory 18. The internal data processing unit 14 is connected both to the communications interface 16 and to the memory 18 of the secured element 12.

The mobile terminal 1 may appear in various forms: a portable computer, a portable telephone of the smartphone type, a tablet, etc.

Figure 2:
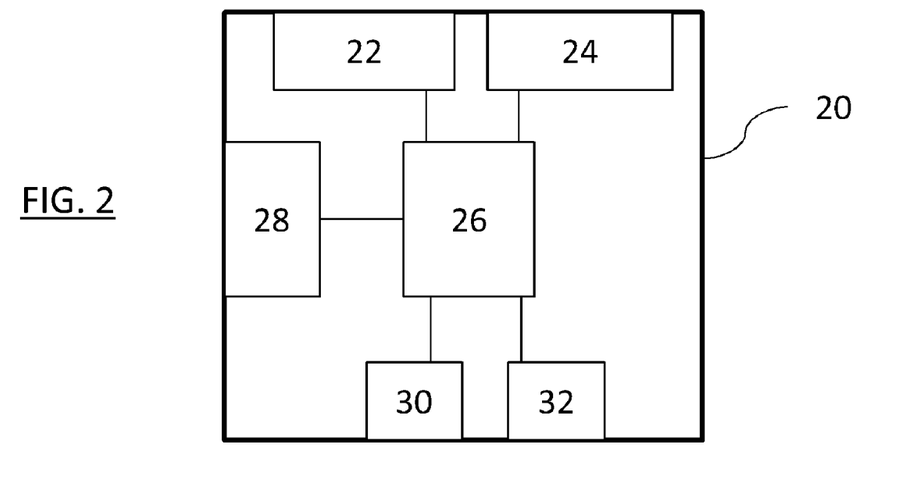
FIG. 2 schematically illustrates a relay terminal according to an embodiment of the invention.

With reference to FIG. 2, a relay terminal 20 comprises a first communications interface 22, a second communications interface 24, a data processing unit 26, and a printer 28.

The first communications interface 22 is adapted for communicating with the communications interface 18 of the mobile terminal 1.

The second communications interface 24, as for it is adapted for communicating with a lottery system 34 which will be described later on.

Both communications interfaces 22, 24 may be of the same type. However, in the following, the non-limiting example of communications interfaces 10 and 22 of the near field type (NFS), and of a communications interface 24 of the Wifi type or wired type for communicating with the lottery server system 34 through Internet will be assumed.

The relay terminal also comprises a display screen 30.

The relay terminal also comprises a dispenser of cash 32. This dispenser 32 conventionally comprises an orifice for providing cash to a person, and a mechanism for distributing cash from a suitable cash box for storing cash as bank notes and/or coins.

The processing unit 26 is adapted for controlling the cash dispenser.

The relay terminal may also comprise payment means (not shown). This payment interface may comprise an orifice for inserting a credit card, and/or at least one input orifice for cash, and a suitable mechanism for conveying the cash inserted through this input orifice into the storage cash box.

The relay terminal 20 for example appears as a game terminal permanently installed in a location for participating in a lottery, such as a betting bar PMU.

Unlike the mobile terminal 1, which may be private, the relay terminal is intended to be able to be used by several players.

Figure 3:
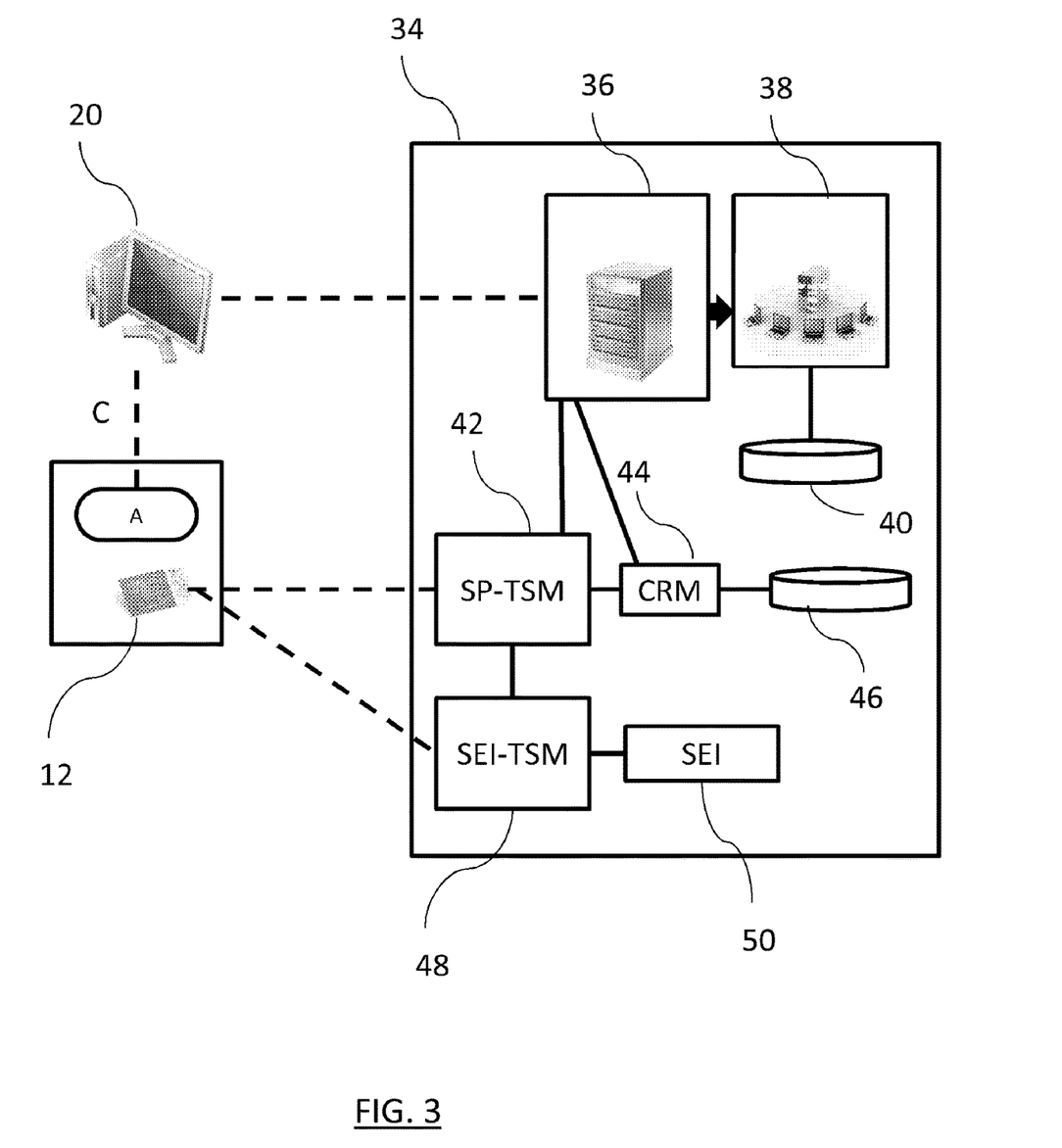
FIG. 3 schematically illustrates the devices illustrated in FIGS. 1 and 2 and a lottery server system, according to an embodiment of the invention.

With reference to FIG. 3, the relay terminal 20 notably has the function of being used as a relay between the mobile terminal 1 and a remote lottery server system a 34.

The lottery server system 34 comprises:
a central lottery management server 36,
a server for storing and processing bet 38,
a server for storing transactions 44 and for processing data with functionalities intended for analyzing the play habits of players and for applying marketing campaigns ("Customer Relationship Manager", conventionally abbreviated as CRM),
two trustworthy servers (called "Trusted Service Manager", and abbreviated as TSM), including:

a server 42 providing services ("Service Provider", here abbreviated as SP-TSM),
a server 48 for managing the secured element ("Secure Element Issuer", here abbreviated as SEI-TSM).

The lottery management server 36 comprises an external communications interface capable of communicating with the relay terminal 2 and/or directly with the mobile terminal 1.

The lottery management server 36 also comprises an internal communications interface for communicating with the storage server 38 and with the service provider server 42.

The lottery management server 36 also comprises means for posting a website accessible through the mobile terminal 1 and/or the relay terminal 20.

The storage server 38 comprises a memory 40 provided for storing the memory a bet database.

The service provider server 42 and 48 comprise means for establishing a secured communications channel with the internal processing unit of the secured element housed in the terminal 1. It is understood that this channel actuates the communications interfaces 16 and 10 or directly through 12 via the OTA channel for example. The secured communications channel may also actuate the relay terminal 20 and/or the lottery management server 36. Alternatively, the service provider server directly communicates with the mobile terminal 1.

A function of the service provider server is to communicate to the relay terminal results of the lottery.

The server 44 ensures a function for analyzing transactions. This function gives the possibility of analyzing the habits of the users and of delivering to them advertising messages. Thus, it ensures a so called CRM ("Customer Relationship Management") function. The server 44 may also be called a CRM server "Customer Relationship Management" and is adapted for communicating with the server 36 and comprises a memory 46.

The secured element management server 48 is connected to the service provider server 42.

Method for Implementing a Lottery

A method for implementing a lottery with the mobile terminal 1, the relay terminal 20 and the lottery system 34 will now be described. This method does not require issuance of a physical lottery ticket for each bet made.

In order to describe this method, the example of a secured element formed with an SIM card associated with a number of a subscriber to a mobile network, and of a mobile terminal 1 of the smartphone type able to communicate via this mobile network.

The method comprises an enrollment phase (A), a betting phase (B), and a result phase (C), the embodiments of which will be successively detailed.

A) Enrollment Phase

Figure 4:
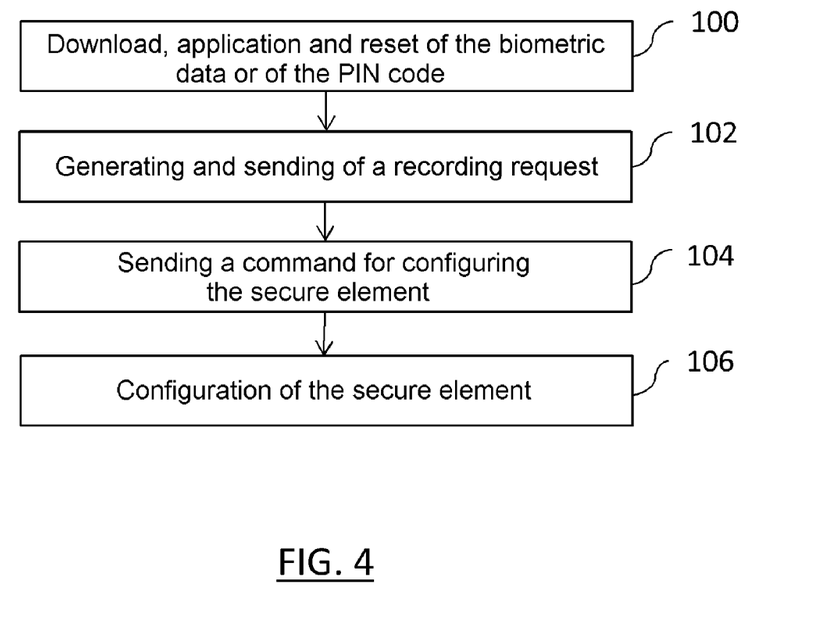
FIGS. 4 to 6 are flow charts of steps of a method for applying a virtual lottery with the devices illustrated in FIGS. 1 to 3, according to an embodiment of the invention.

With reference to FIG. 4, in a step 100, an application program A, designated in the following by "game application" is downloaded into the memory 8 of the mobile terminal 1 from an application server. This application serve may for example be part of the lottery server system or not (e.g.: a merchant server such as Google Store . . . ).

The game application is adapted for cooperating with the operating system executed by the processing unit 4 of the mobile terminal.

The game application may further be configured for interacting with pages of the website executed by the central lottery server 36.

In a step 102, the game application A then generates a request for registration of the user of the mobile terminal as a potential player in a future lottery organized by the lottery system, and sends this request to the lottery server system 34.

The registration request comprises data giving the possibility of identifying a user of the mobile terminal: for example, the subscriber telephone number of this user, and an identifier of its mobile network operator.

These data may for example be inputted by the user after display on the screen 6 of the terminal 1 of a message prompting the user of the terminal 1 with this input.

The application A controls the sending of the registration request to the lottery system, and more specifically to the SP-TSM server 42. When the lottery server system 34 receives the registration request, the following steps are applied.

The SEI-TSM server 42 generates a command for configuring the secured element 12. It communicates this configuration command to the SEI-TSM server which either will give it data allowing it to access the secured element or will ensure the connection to the secured element.

The servers 42 and/or 48 apply a verification of these data (steps "Check Eligibility", "Provisioning", "Activation" in the sense of the standard defined by the Global Platform or AFSCM Association).

The configuration command is transmitted 104 to the secured element 12, by the SEI-TSM 48 and SP-TSM 42 servers.

This configuration command is received by the game application A installed in the mobile terminal 1 and triggers a configuration 106 of the secured element 12.

The configuration 106 of the secured element 12 notably comprises:
  downloading from the server system a game applet to be installed in the memory 18 of the secured element 12,
  allocating memory space in the internal memory 18, dedicated to the storage of data in connection with a lottery organized by the lottery server system 34;
  installing the downloaded applet in the allocated space in the memory 18.

Within the scope of the present method, the configuration 106 of the secured element is applied after complete download 100 of the game application, which gives the possibility of avoiding the implementation in the applet of a mechanism for awaiting download of the application A.

Once the configuration is completed, the lottery server system 34 sends a message confirming the registration of the player. This message may be transmitted to the mobile terminal 1 via a dedicated message, for example a message of the SMS type or a customized message. This message may be encrypted.

In this registration confirmation message, the user is informed that he/she is presently registered at the lottery server system, that the contents of the secured element is configured, and that he/she may therefore participate in a lottery organized by the system, as a player, via the game application installed in the mobile terminal 1.

During these exchanges, the SP-TSM server 42 and the lottery server 36 inform the CRM server 44 on the addition of a new player. Anonymous data will be transferred via the telephone number for example.

The whole of the transmitted data may be copied into and stored in memory by the CRM server 44. Thus the CRM server 44 may identify game habits associated with a telephone number. For example: the telephone number 0606060606 plays 10 Euros every Friday, and every Friday the 13$^{th}$, 20 Euros are played. Thus the lottery will be able to send him/her an SMS on Thursday the 12$^{th}$ so that he/she does not forget or tells them about more significant game bets and therefore larger gains on a Tuesday. It is understood that this analysis of the habits of the player may be applied without knowing the name of the owner of the telephone number.

B) Betting Phase

At this stage it is assumed that the player has identified a lottery in which he/she wishes to participate, via a menu of the application displayed on the screen of his/her mobile terminal.

Figure 5:
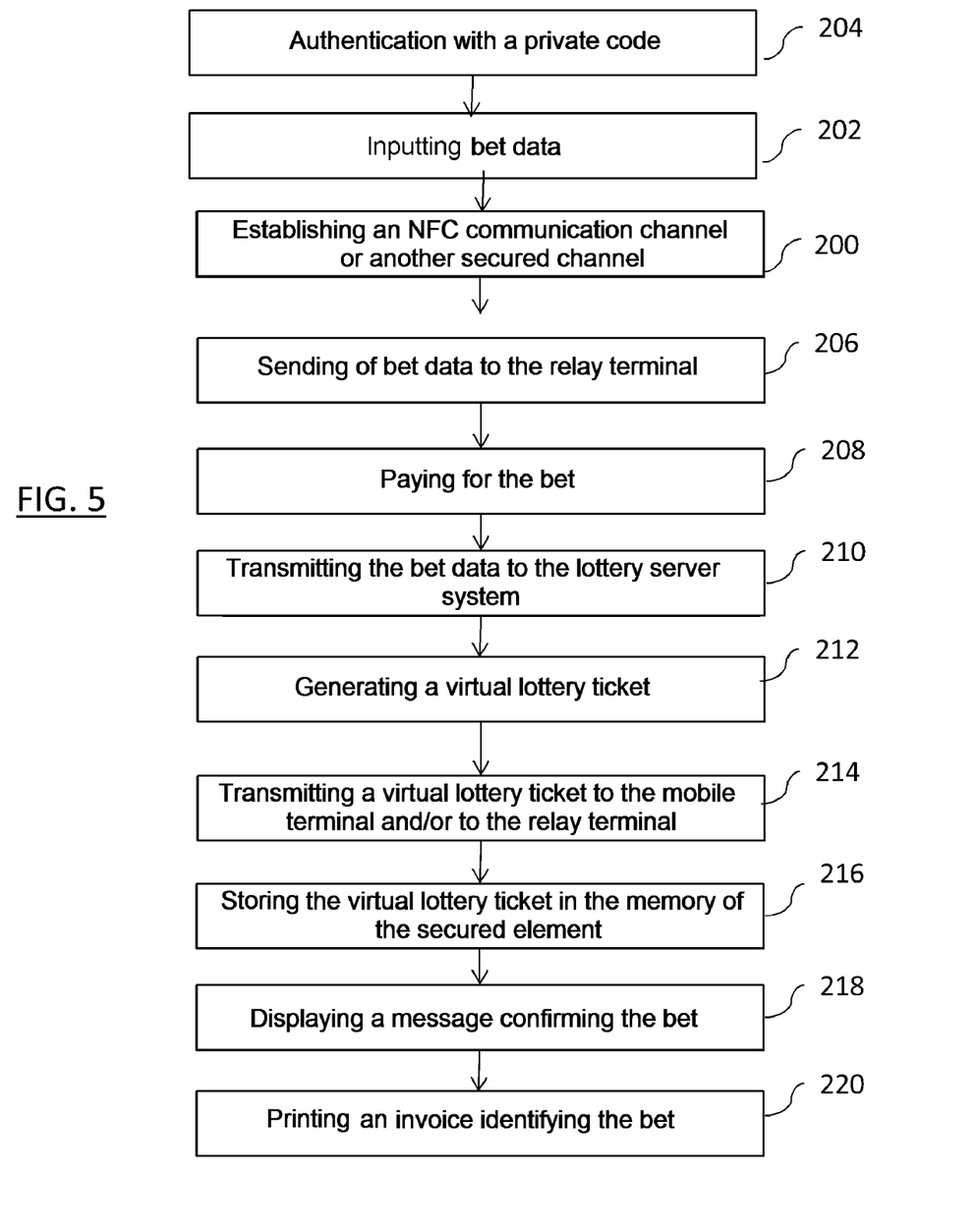

With reference to FIG. 5, the player inputs 202 representative data of a bet by means of the input interface of the mobile terminal 1. These data typically comprise:
  a combination of characters or symbols selected from a set of possible combinations, for example a series of figures,
  optionally a wager, (otherwise, the sum of the bet is determined by the application A), and/or
  an optional type of bet, if the lottery allows several types of bets.

Additionally, the game application controls the display of a message prompting the player to input an authentication code, with the purpose of authenticating the bet. The authentication code for example be a PIN code or else a biometric code if the terminal is provided with a suitable biometric sensor.

The application receives the authentication code inputted by the player and compares it with a predetermined reference code.

If both codes are identical, then the application A will allow emission 206 of the bet data to the relay terminal 20.

When such a player provided with his/her mobile terminal 1 appears in proximity to the relay terminal 20, the game application A controls the establishment 200 of a near field communications channel C between the secured element 12 and the relay terminal 20.

Once the channel C is established, the mobile terminal 1 transmits the bet data inputted at the relay terminal 20. It is therefore understood that bet data inputted before establishing the channel C may be stored in memory temporarily by the mobile terminal 1 or the secured element 12.

Moreover, the application A controls display of a message inviting the player to proceed with payment 208 of the bet according to methods known to the person skilled in the art. For example, the payment 208 may be initiated via payment means integrated to the relay terminal 20.

After this payment, the relay terminal 20 transmits 210 the data of the bet to the lottery server system 34.

The storage server 38 stores the data of the bet in memory in the data base 40, optionally accompanied by other pieces of information such as:
  the date of the betting,
  the date of the drawing of the lottery for which the player has bet, and/or
  elements for authentication of the player.

The storage server 38 generates a message 212 comprising the data of the bet as well as the telephone number which is associated therewith. This message will be send to the TSM server 42 on the one hand and to the TSM server 44 on the other hand.

The virtual lottery ticket generated is transmitted 214 to the mobile terminal 1 by the SP-TSM server 42. The transmission 214 of the lottery ticket to the mobile terminal 1 may be carried out via the relay terminal 20, or else without passing through the relay terminal 20.

The virtual lottery ticket is stored in memory 216 in the allocated space in the internal memory 18 of the secured element 12, this space being generated beforehand during the enrollment phase.

The player owner of the mobile terminal 1 at this stage a virtual bearer coupon, proving his/her participation in the lottery according to the bet which he/she has made via this same mobile terminal 1.

In order to inform the player on the existence of this proof, the SP-TSM server 42 may send an SMS or a dedicated message, to the mobile terminal 1 reminding him/her of his/her bet, and by announcing it to be officially valid.

The lottery ticket may also be transmitted to the relay terminal 20. In this case, the processing unit 26 of the relay terminal 20 may control is the printing, via the printer 28 of a small invoice which may optionally act as additional proof of participation in the lottery, in addition to the storing in memory 216 of the virtual lottery ticket in the secured element 12.

Moreover, the generated virtual lottery ticket is stored in memory in the transaction memory 42. The virtual lottery ticket may thus be recovered subsequently later on by the player in the case of theft or loss of his/her mobile terminal 1 or from its secured element 12, by means of a suitable loading request initiated from his/her (new) mobile terminal.

The same steps of the betting phase B) are applied by several players, with different mobile terminals.

Each bet made and the unique transaction numbers are stored in memory in the data base 40 and/or in the memory 46.

The transaction numbers for the different bets for a same lottery are all different so as to identify with certainty a bet.

C) Result Phase

It is assumed that a drawing has been carried out, a drawing which is expressed in the lottery server system 34 by an association in the data base 40, of each bet stored in memory with a positive or zero corresponding gain value.

It is also assumed that the player owner of the terminal 1 is present after the drawing in the proximity of a relay terminal 20 (the same one which is used for betting, or another relay terminal also connected to the lottery server system 34) and that a communications channel C has been established between the mobile terminal 1 and this relay terminal (step 200).

Figure 6:
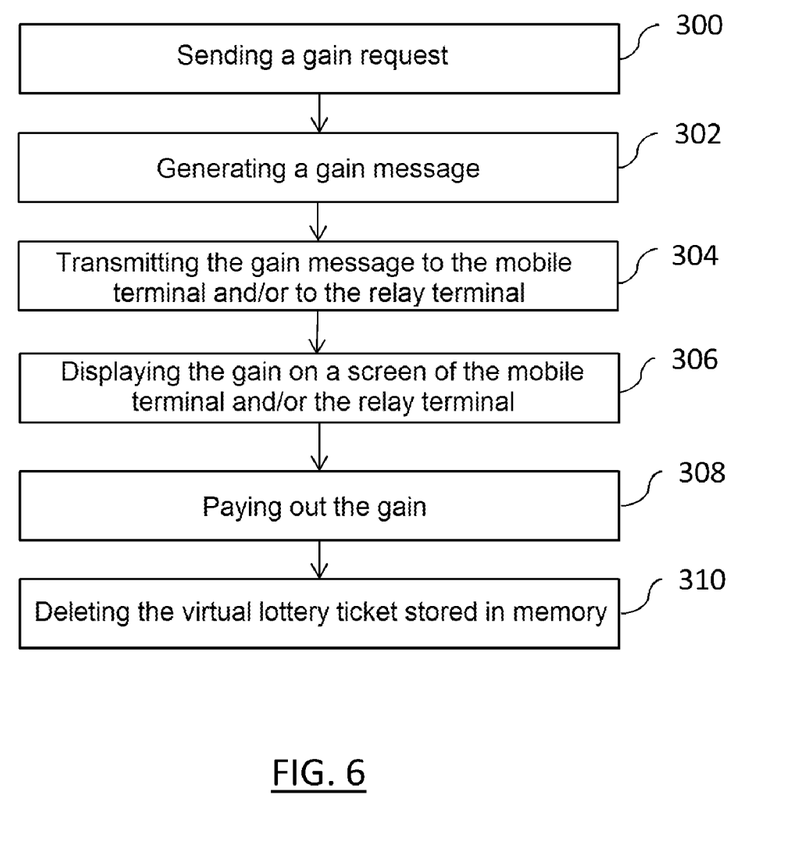

With reference to FIG. 6, in a step 300, the application A controls the sending of a gain request for the bet made towards the lottery server system 34.

The gain request for example comprises the unique transaction number comprised in the virtual lottery ticket stored in memory in the secured element 12.

This sending 300 may be triggered on the initiative of the player, via a dedicated menu generated by the application A and displayed on the screen 6 of the mobile terminal 1. Alternatively, this request is automatically emitted, after the date of the drawing if the latter is predetermined by the application A.

The sending 300 of the gain request may also be conditioned by the positive result of an authentication such as the authentication 204 described within the scope of the betting phase B).

The gain request is then re-transmitted by the relay terminal 20 to the lottery system 34, and more specifically to the storage server 38.

The storage server 38 searches for a gain value associated with the unique transaction number.

This gain value is then transmitted 304 by the lottery server system to the relay terminal 20 and/or to the mobile terminal 1.

The sending of the gain value 304 may also be triggered automatically by the lottery server system 34, subsequently to the drawing.

When the relay terminal 20 receives the gain value, the processing unit 26 controls the display on the display screen 30 of the received gain value.

The payment of a sum corresponding to the gain value is then carried out to the benefit of the user, if this gain value is greater than zero.

For example, provision may be made for carrying out the payment in cash, by means of cash stored beforehand in the cash box of the dispenser 32 integrated to the relay terminal 20.

Alternatively, the payment is applied by gyro, by actuation of banking sites, according to a known method.

The application A then controls deletion 310 of the virtual lottery ticket in the memory 18 of the secured element 12.

This deletion 310 may be triggered immediately upon receiving by the application a gain value which proves to be zero.

This deletion 310 may be also triggered upon receiving a message that a payment of a gain value associated with the unique identifier to the benefit of a beneficiary identified by the bet data has been carried out. This message may be emitted by the relay terminal 20 when the latter pays, via its integrated dispenser, the owner of the mobile terminal 1. Nevertheless, the deletion will preferably always be controlled from the application 42 which updates the contents of the memory of the secured element.

The method for implementing a virtual lottery which is proposed here provides many advantages:

- suppressing the paper ticket "to the bearer" (the proof of the bet is electronic)
- achieve certain economical savings by suppressing the paper,
- authenticating the player when he/she will seek his/her gain. Thus, even if his/her portable telephone is stolen, the thief will not be able to fetch the gains.
- in the case of loss or theft of the mobile, the player will be able to have sent to him/her his/her proof of bet, stored in memory by the lottery server system.
- the player is authenticated but remains anonymous.

The invention claimed is:

1. A method for participating in a lottery comprising the following steps applied by a mobile terminal comprising an input interface and a secured element:
   acquisition via the input interface of bet data,
   sending the acquired bet data to a lottery server system,
   receiving, via a secured communication channel, a virtual lottery ticket generated by the lottery server system in response to the sending of the bet data, the virtual lottery ticket comprising a unique identifier of the bet made,
   storing the virtual lottery ticket in a memory of the secured element,
   receiving a gain value emitted by the lottery server system and associated with the unique identifier,
   displaying the gain value received on a screen of the mobile terminal,
   deleting the virtual lottery ticket stored in memory in the secured element in response to:
   receiving a gain of zero value associated with the unique identifier, and/or receiving a message indicating that a payment of a gain value associated with the unique identifier has been carried out to the benefit of a beneficiary identified by the bet data.

2. The method according to claim 1, comprising the establishment of a near-field communications channel with a relay terminal, the bet data being emitted into the channel established with view to their retransmission by the relay terminal to the lottery server system.

3. The method according to claim 1, further comprising a comparison between a code inputted via the input interface and a reference code stored in memory by the secured element and specific to the user of the mobile terminal, the bet data being either emitted or not to the lottery server system depending on the result of the comparison.

4. The method according to claim 1, comprising the sending to the lottery server system a gain request comprising the unique identifier stored in memory by the secured element, the reception of the gain value being a response to the sending of the gain request.

5. A method for participating in a lottery comprising the following steps applied by a mobile terminal comprising an input interface and secured element:
    sending to a lottery server system a subscriber number specific to a subscriber identification card, to a mobile network (SIM) of the mobile terminal,
    receiving a command for configuring the secured element having as an addressee the subscriber number,
    allocating, in the secured element, a memory space from the received configuration command, wherein the virtual lottery ticket is stored in the allocated memory space acquisition via the input interface of bet data,
    sending the acquired bet data to a lottery server system,
    receiving via a secured communication channel, a virtual lottery ticket generated by the lottery server system in response to the sending of the bet data, the virtual lottery ticket comprising a unique identifier of the bet made,
    storing the virtual lottery ticket in the allocated memory space,
    receiving a gain value emitted by the lottery server system and associated with the unique identifier, and
    displaying the gain value received on a screen of the mobile terminal.

6. A mobile terminal comprising:
    an interface for inputting bet data,
    a communications interface for communicating with a lottery server system via a secured communication channel,
    a secured element comprising a memory,
    the terminal wherein:
        at least one processing unit configured for controlling:
            sending the inputted bet data to the lottery server system,
            storing in the memory of the secured element a virtual lottery ticket generated by the server in response to the sending, received by the communications interface, the virtual lottery ticket comprising a unique identifier allowing identification of the bet made,
            deleting the virtual lottery ticket stored in memory in the secured element in response to:
                receiving a gain of zero value associated with the unique identifier, and/or receiving a message indicating that a payment of a gain value associated with the unique identifier has been carried out to the benefit of a beneficiary identified by the bet data.

7. A method for participating in a lottery comprising the following steps applied by a mobile terminal comprising an input interface and a secured element:
    acquisition via the input interface of bet data,
    sending the acquired bet data to a lottery server system,
    receiving, via a secured communication channel, a virtual lottery ticket generated by the lottery server system in response to the sending of the bet data, the virtual lottery ticket comprising a unique identifier of the bet made,
    storing the virtual lottery ticket in a memory of the secured element,
    deleting the virtual lottery ticket stored in memory in the secured element in response to:
        receiving a gain of zero value associated with the unique identifier, and/or receiving a message indicating that a payment of a gain value associated with the unique identifier has been carried out to the benefit of a beneficiary identified by the bet data.

\* \* \* \* \*